US004001730B2

United States Statutory Invention Registration [19]

[11] Reg. Number: H1730

Sutherland

[45] Published: May 5, 1998

[54] FUNCTIONALIZED STAR POLYMERS

[75] Inventor: Robert Jude Sutherland, Houston, Tex.

[73] Assignee: Shell Oil Company, Houston, Tex.

[21] Appl. No.: 942,019

[22] Filed: Sep. 8, 1992

Related U.S. Application Data

[63] Continuation of Ser. No. 530,132, May 29, 1990.

[51] Int. Cl.[6] ..... C08F 293/00

[52] U.S. Cl. ..... 525/299

[58] Field of Search ..... 525/250, 271, 525/299

[56] References Cited

U.S. PATENT DOCUMENTS

| | | | |
|---|---|---|---|
| 3,739,042 | 6/1973 | Chu et al. . | |
| 3,985,830 | 10/1976 | Fetters et al. . | |
| 4,001,350 | 1/1977 | Fahrbach et al. | 260/880 B |
| 4,010,226 | 3/1977 | Crossland et al. | 260/880 B |
| 4,461,874 | 7/1984 | Teyssie et al. . | |
| 4,463,131 | 7/1984 | Grandzol et al. . | |
| 4,523,000 | 6/1985 | Hatada et al. . | |
| 4,559,389 | 12/1985 | Hatada et al. . | |
| 4,694,035 | 9/1987 | Kasai et al. . | |
| 4,813,983 | 3/1989 | Nohmi et al. . | |
| 4,975,491 | 12/1990 | Quirk | 525/299 |

FOREIGN PATENT DOCUMENTS

| | | | |
|---|---|---|---|
| 772158 | 3/1972 | Belgium . | |
| 0973295 | 8/1975 | Canada | 525/299 |
| 973295 | 8/1975 | Canada . | |
| 298667 | 1/1989 | European Pat. Off. . | |
| 315431 | 5/1989 | European Pat. Off. . | |
| 856581 | 6/1957 | United Kingdom . | |

OTHER PUBLICATIONS

R. Lutz & P. Rempp, "New Developments in Star Polymer Synthesis", Makromol. Chem. 189, 1051–1060 (1988).

*Primary Examiner*—Charles T. Jordan
*Assistant Examiner*—Meena Chelliah

[57] ABSTRACT

Block polymers of the star type contain a central core of crosslinked bisunsaturated compound and a plurality of functionalized branches attached to the core, each branch containing at least a terminal portion of polymerized alkyl methacrylate, polymerized through the ethylenic unsaturation of the methacrylate moiety. The polymers are useful in adhesive formulations and as viscosity index improvers for hydrocarbon fluids.

20 Claims, No Drawings

FUNCTIONALIZED STAR POLYMERS

This is a continuation of application Ser. No. 07/530,132, filed May 29, 1990.

FIELD OF THE INVENTION

This invention relates to certain novel block polymers of the star polymer type, further characterized by the presence of functionalized branches. More particularly, the invention relates to block polymers wherein a plurality of polymerized methacrylate blocks are attached to a central core.

BACKGROUND OF THE INVENTION

The production of "star" block copolymers is known in the art. Such polymers are generally characterized by a polymerized block of diolefin which serves as a center or core of the block polymer and to which a number, occasionally a large number, of blocks of at least one other polymerized monomer are attached. Milkovich, Canadian patent 716,645, discloses the production of such star polymers by sequentially anionically polymerizing an alkenyl-substituted aromatic hydrocarbon and a conjugated alkadiene hydrocarbon to form a "living" intermediate block and coupling at least two of such blocks by the addition of a dialkenyl aromatic hydrocarbon. Although the scope of the polymerization is extensive, styrene and butadiene are preferred as precursors of the intermediate block, divinylbenzene is preferred as the monomer of the coupling agent and a lithium alkyl such as sec-butyllithium is employed as the anionic polymerization initiator. In a Milkovich-type process, it is not uncommon that the species used as a coupling agent, e.g., a polymerized divinylbenzene, becomes at least partially insoluble. This insolubility results in limitations upon the molecular weight of the resulting star polymer.

An alternate process of producing star shaped polystyrene polymers is disclosed by Lutz et al, Makromol. Chem., 189, 1051–1060 (1988). This process comprises the use of a low molecular weight living polystyrene polymer, anionically polymerized with an alkali metal compound which in this case is the metal aryl potassium naphthalene, to initiate polymerization of a bisunsaturated monomer such as divinylbenzene. The resulting living polymeric intermediate, having a number of organometallic sites, remains soluble under the reaction conditions. This intermediate serves as the core on which a number of additional blocks are polymerized as "arms" or branches. A variety of monomers are said to be useful in the formation of the branches including styrene, alkadienes, vinylpyridines and methacrylate esters. In the latter two cases, ethylene dimethacrylate is said to be used as the bisunsaturated monomer, although no preparation of such polymers is described. The polymers of Lutz et al typically exhibit a wide range of molecular weight and there is no terminal functionalization of the branches described except in cases where a living branched polymer is used to polymerize a second dissimilar monomer, ethylene oxide, as the terminal portion of the branches. The resulting star polymers have terminal hydroxyl groups at the outer end of the branches to functionalize the polymers. Such functionalization is achieved, however, at the expense of an additional polymerization step to incorporate the ethylene oxide moieties. Attempts to functionalize without additional polymeization as by reaction of the metalated branched intermediate with carbon dioxide or substantially stoichiometric portions of ethylene oxide were not successful. Thus, the functionalized star polymers as envisioned by Lutz et al are rather limited. It would be of advantage to provide additional star block polymers which are functionalized at the end of the branches.

SUMMARY OF THE INVENTION

The present invention provides a novel class of block polymers of the star type wherein a number of branches of at least one polymerized monomer are attached to a central polymeric core. More particularly, the present invention provides such star polymers wherein at least the terminal portions of the branches are functionalized by a block of polymerized alkyl methacrylate, polymerized through the ethylenic unsaturation of the methacrylate moiety.

DESCRIPTION OF THE INVENTION

The functionalized star block polymers of the invention are produced by preparing a relatively low molecular weight polymeric initiator by reaction of a metal hydrocarbon compound, typically an alkali metal alkyl, and an anionically polymerizable monomer. This polymeric initiator is then used to crosslink a bisunsaturated monomer to form a crosslinked polymeric block having a plurality of organometallic sites, which crosslinked polymer serves as the core of the ultimate star block polymer product. This core containing metallic sites is utilized to initiate the growth of a number of branches by polymerization of one or more polymerizable monomers including, as a terminal monomer, an alkyl methacrylate. The resulting star block polymers are characterized by a relatively uniform molecular weight distribution with functionalized blocks, i.e., blocks of polymeized alkyl methacrylate, as at least the terminal portion of the branches.

In the initial step of the production of the star block polymers of the invention, at least one anionically polymerizable monomer is polymerized to a relatively low molecular weight organometallic polymeric initiator by contact with a monofunctional metal hydrocarbon compound polymerization initiator. The metal hydrocarbon initiator is suitably a monofunctional alkali metal hydrocarbon compound such as an alkali metal alkyl or an alkali metal aryl. Metal alkyls are generally preferred, particularly those alkali metal alkyls comprising lithium and a secondary alkyl moiety. Especially preferred is a sec-butyllithium.

The anionically polymerizable monomer to be polymerized and thereby form the relatively low molecular weight polymeric initiator is at least one of an alkenyl aromatic compound, e.g., styrene or α-methylstyrene, a conjugated alkadiene, e.g., butadiene or isoprene, or a vinylpyridine. It is useful on some occasions to employ more than one anionically polkymerizable monomer, polymerized sequentially or copolymerized, in the preparation of the relatively low molecular weight organometallic polymerization initiator. In most instances, however, a single anionically polymerizable monomer is used to produce the initial polymeric initiator. Particularly good results are obtained when the anionically polymerizable monomer is an alkenyl aromatic compound such as styrene or a conjugated alkadiene such as isoprene.

The polymerization to produce the initial polymeric initiator is conducted by conventional methods as by contacting the at least one anionically polymerizable monomer and the alkali metal hydrocarbon compound in a suitable reaction solvent under moderate reaction conditions. Hydrocarbon reaction solvents, particularly cycloaliphatic hydrocarbon solvents such as cyclohexane are suitable as reaction solvents. It is useful on some occasions to employ a reaction solvent of greater polarity and in such instances a mixed solvent, often a mixture of cyclohexane and a polar co-solvent, e.g., an ether co-solvent such as diethyl ether or tetrahydrofuran, is used. The use of cyclohexane or cyclohexane-diethyl ether as reaction solvent is preferred. The polymerization temperature is moderate, for example from about 10° C. to about 60° C. and it is often useful to conduct this polymerization at ambient temperature. The reaction pressure is a pressure sufficient to maintain the reaction mixture in a liquid phase. Typical reaction pressures are from about 0.8 atmospheres to about 5 atmospheres. Control of the molecular weight of the resulting polymeric species is achieved by conventional methods as by controlling the ratio of metal hydrocarbon compound and anionically polymerizable monomer. The resulting polymeric species is conventionally termed a living polymer because of the presence therein of an organometallic site and will preferably have a molecular weight less than about 2000 and often on the order of about 1000.

This polymeric species, itself a polymerization initiator because of the organometallic sites, is used to crosslink a bisunsaturated monomer to form the block polymeric moiety which serves as the central portion or core of the star block polymer of the invention. A variety of bisunsaturated monomers are useful in the production of the core of the star block polymers of the invention but good results are obtained through the use of a di(alkenyl) aromatic compound of up to 20 carbon atoms and up to 2 aromatic rings. Illustrative of such di(alkenyl) aromatic compounds are divinylbenezene, divinyltoluene, divinylbiphenyl, divinylnaphthalene, diisopropenylbenzene, diisopropenylbiphenyl and diisobutenylbenzene. Divinyl aromatic compounds are preferred as the bisunsaturated monomer and particularly preferred is divinylbenzene.

The crosslinking of the bisunsaturated monomer with the polymeric initiator is conducted most easily in the medium in which the initiator is produced by adding the bisunsaturated monomer to the product mixture containing the polymeric initiator. The use of the same or similar reaction conditions and reaction solvent are suitable for the crosslinking reaction to form the core of the ultimate star block polymer. The crosslinked bisunsaturated monomer product which results is a rather small, tightly-crosslinked polymeric moiety having a plurality of organometallic sites, the number of which depends in part on the ratio of bisunsaturated monomer and the polymeric initiator utilized in the crosslinking process. The polymeric core also has, attached thereto, moieties of the polymeric initiator which served as the crosslinking or polymerization agent. It is from the oranometallic sites of this crosslinked core that the methacrylate-containing branches are grown.

The star block polymers of the invention therefore comprise the core of crosslinked bisunsaturated monomer and attached thereto relatively low molecular weight polymeric species derived from the polymeric initiator and a plurality of functionalized branches incorporating at least a terminal block of polymerized alkyl methacrylate. In one modification of the star block polymers of the invention, the functionalized branches are homopolymeic alkyl methacrylate branches wherein the alkyl group independently has up to 30 carbon atoms, preferably up to 20 carbons. Such homopolymeric functionalized branches result from block polymerization of alkyl methacrylate, the polymerization being through the ethylenic unsaturation of the methacrylate moiety, employing the organometallic sites of the crosslinked core as the anionic polymerization initiator to grow a plurality of polymerized alkyl methacrylate branches on the crosslinked core. The alkyl methacrylate esters which are polymerized according to this modification include methyl methacrylate, ethyl methacrylate, sec-butyl methacrylate, t-butyl methacrylate, sec-amyl methacrylate, octyl methacrylate, decyl methacrylate, dodecyl methacrylate and octadecyl methacrylate. In this modification, preferably conducted in the medium in which the central core containing organometallic sites is produced, the polymeric core is contacted with alkyl methacrylate to produce the homopolymeric alkyl methacrylate branches. The choice of alkyl methacrylate will in part depend upon the particular nature of the star block polymer desired. However, the production of polymerized alkyl methacrylate branches wherein the alkyl is primary and of few carbon atoms is relatively difficult because of the rather low reaction temperatures that are required to produce the polymerized alkyl methacrylate branches. alternatively, the production of polymerized alkyl methacrylate branches wherein the alkyl moiety is a higher alkyl moiety is also difficult because of the relatively inactive character of such alkyl methacrylates and the difficulty of readily obtaining the desired alkyl methacrylate monomer. The preferred alkyl methacrylates for forming the star block polymer of methacrylate-containing branches is a branched-butyl methacrylate, i.e., sec-butyl methacrylate or t-butyl methacrylate. The star block polymers resulting from use of these methacrylates are preferred products because of the desirable properties thereof but also because of the relative ease of production. Star block polymers incorporating other alkyl methacrylate moieties are produced directly from the corresponding alkyl methacrylate but it is often desirable to produce such polymers by initially employing a branched-butyl methacrylate to produce a star block polymer having branched-butyl methacrylate branches and subsequently trans-esterifying the initial star block polymer product to incorporate the desired alkyl moieties.

In the production of a branched-butyl methacrylate-containing polymer suitable reaction conditions typically include a reaction temperature from about −80° C. to about 80° C. with the lower portion of that range being preferred for polymerization of sec-butyl methacrylate and the higher portion of the range being preferred for t-butyl methacrylate. The polymerization pressure is suitably sufficient to maintain the reaction mixture in a liquid phase, typically up to about 5 atmospheres.

In a second modification of the star block polymers of the invention, the functionalized branches grown from the core contain an initial or internal segment or block of polymerized anionically polymerizable monomer and a second or terminal portion of polymerized alkyl methacrylate. In this modification, the organometallic sites of the crosslinked core are used to initiate the growth from the core of the segments of polymerized anionically polymerizable monomer which should not be of greater length than the length of the polymeric initiator used to prepare the crosslinked core. The resulting block polymer, containing organometallic sites on the branches thereof, is used to initiate the growth of the terminal segments of polymerized alkyl methacrylate.

The anionically polymerizable monomer employed as precursor of the internal, non-functionalized segment is the same monomer or is a different monomer than that used to produce the polymeric initiator for the crosslinking of the bisunsaturated monomer to form the central core. Preferred anionically polymerizable monomers for producing any non-functionalized portion of the branches of the star block polymer are alkenyl aromatic compounds such as styrene and conjugated alkadienes such as isoprene. The crosslinked polymeric core containing organometallic sites is suitably reacted in situ with the anionically polymerizable monomer at a reaction temperature of from about 10° C. to about 60° C. and a reaction pressure of up to about 5 atmospheres. The resulting star block polymer intermediate containing a plurality of polymerized anionically polymerizable monomer branches with organometallic sites is then reacted in situ with alkyl methacrylate, preferably branched-butyl methacrylate, as described above, to produce the desired star block polymer having alkyl methacrylate-containing branches.

Independent of the modification by which the functionalized alkyl methacrylate-containing branches are produced, when the desired polymerization has been achieved further reaction is terminated by the addition to the product mixture of a small amount of an active hydrogen compound, typically an alcohol such as methanol, according to known procedures. The star block polymer having functionalized alkyl methacrylate-containing branches is then recovered by conventional procedures such as solvent removal or addition of a non-solvent to coagulate the polymer. A typical non-solvent for this purpose is aqueous methanol.

The polymeric products of the invention are block polymers of the star type characterized by a central core of crosslinked bisunsaturated monomer and a plurality, e.g., more than one and preferably of at least 3 functionalized branches attached thereto wherein at least the outer portion of substantially each functionalized branch is poly(alkyl methacrylate) polymerized through the ethylenic unsaturation of the methacrylate moiety and wherein each alkyl independently has up to 30 carbon atoms. It should be appreciated that non-functionalized branches, i.e., branches not containing at least a terminal portion of polymerized alkyl methacrylate are present, resulting from initiation of crosslinking by the polymeric initiator and premature chain termination during the production of an intended internal, non-functionalized segment of a branch. Nevertheless, a substantial proportion of the branches are functionalized by the presence of an at least terminal portion of polymerized alkyl methacrylate.

The molecular weight of the star block polymers of the invention will vary with the choice of reaction conditions, reaction solvent and the relative proportions of monomeric reactants as well a determined in part by whether the functionalized branches are homopolymeric or contain an internal portion of polymerized anionically polymerizable monomer. The star block polymers of particular interest have a molecular weight from about 20,000 to about 2,000,000 and particularly from about 50,000 to about 1,000,000. It should be understood that the precise molecular weight will vary from molecule to molecule and that the above values are average values. It is, however, characteristic of the star block polymers of the invention that the polymer has a rather narrow molecular weight distribution.

The star block polymers are therefore represented by the formula $$(A)_r C \left[ (A)_r M \right]_s \quad (I)$$

wherein C is the block of crosslinked bisunsaturated monomer, A independently is a block of polymerized anionically polymerizable monomer, M is a block of polymerized alkyl methacrylate, wherein each alkyl independently has up to 30 carbon atoms, polymerized through the ethylenic unsaturation of the methacrylate moiety, r is 0 or 1, s is an average number from about 3 to about 50, more frequently from about 10 to about 30, and t is a number up to 50 which is equal to or greater than s. While the proportions of the moieties represented by the terms C, A and M will vary somewhat from molecule to molecule, the percentage of the molecular weight of the molecule attributable to the central core, C, is no more than about 10% and preferably no more than about 2%. Within the functionalized branches, $-(A)_r M$, the percentage of polymerized alkyl methacrylate is, of course, 100% in the case of a homopolymeic branch and less in the case where the branch contains an internal segment of polymerized anionically polymerizable monomer. The percentage of molecular weight of the functionalized branches attributable to polymerized alkyl methacrylate is at least about 50% and preferably at least about 90%. Homopolymeric branches of polymerized alkyl methacrylate are particularly preferred.

The star block polymers of the invention are members of the class of materials termed thermoplastic rubbers in that the polymers exhibit elastomeric properties at ambient temperature and yet demonstrate thermoplastic character at moderately elevated temperatures. The polymers are therefore useful in a number of applications conventional for thermoplastic elastomers, particularly including adhesive formulations. Moreover, by virtue of the blocks of polymerized alkyl methacrylate, the star block polymers are useful as viscosity index improvers for motor oil and other hydrocarbon fluids.

The invention is further illustrated by the following Comparative Examples (not of the invention) and the Illustrative Embodiments which should not be regarded as limiting.

COMPARATIVE EXAMPLE I

To a glass polymerization bottle was charged 300 ml of cyclohexane and the bottle was purged with a continuing stream of nitrogen. While the contents of the bottle were stirred, 50 ml of diethyl ether were added. Two drops of diphenylethylene were added as a titration indicator and the mixture was titrated with about 1.5 ml of s-butyllithium until the solution turned light orange in color. An additional 1.5 ml of s-butyllithium was added and a total of 1.0 ml of divinylbenzene was added dropwise. The solution turned dark red after about 0.5 ml had been added and after addition was complete the resulting solution was stirred for 20 minutes. To the resulting solution 13.0 ml of t-butyl methacrylate were added dropwise as the color of the solution lightened to a murky orange. The polymerization was terminated by adding 1.0 ml of methanol and the product was coagulated with methanol and water. The resulting elastomeric product, upon drying, was a fine powder.

COMPARATIVE EXAMPLE II

A round-bottom flask of 500 ml capacity was flushed with nitrogen and 250 ml of cyclohexane was added. Stirring was initiated as the contents of the flask were warmed, under reflux, to 40° C. under nitrogen and 50 ml of diethyl ether were added. Two drops of diphenylethylene were added as an indicator and the solution was titrated with s-butyllithium until a dark yellow color was attained. After the addition of 1.5 ml of s-butyllithium, 1.0 ml of divinylbenzene was added, dropwise, as the color of the solution turned dark red-purple. The solution was stirred for 20 minutes as the color changed to a dark rust and a precipitate formed. The heating was discontinued and the solution was allowed to cool to room temperature. After cooling, 13.0 ml of t-butyl methacrylate was added in a dropwise manner as the color turned to a murky cream. After stirring for 15 minutes, the polymerization was terminated by the addition of methanol and the solution became milky in color as the precipitate dissolved. The resulting product was coagulated in methanol and water.

ILLUSTRATIVE EMBODIMENT I

A glass polymerization bottle was equipped with a mechanical stirrer and a syringe through which chemicals were added. The bottle was flushed with and maintained under nitrogen. After the addition of 200 ml of cyclohexane, stirring was initiated. To the bottle were added 1.0 ml of N,N,N',N'-tetramethylethylenediamine and 4 drops of diphenylethylene. The solution was titrated with a s-butyllithium to a light orange color which did not change when an additional 1.5 ml of s-butyllithium were added. After 3.2 ml of isoprene were added dropwise, 1.0 o of divinylbenzene was added dropwise as the color of the solution turned to a dark red. The resulting solution was stirred for 20 minutes and 13.0 ml of t-butyl methacrylate was added dropwise. The solution was stirred for two hours as the color faded to a light orange. Polymerization was terminated by addition of 10 ml of methanol. The solvent present was removed by evaporation and the resulting oil was coagulated in isopropyl alcohol, methanol and water.

ILLUSTRATIVE EMBODIMENT II

To a glass polymerization bottle flushed with nitrogen and equipped with a stirrer was added 200 ml of cyclohexane and 20 ml of tetrahydrofuran and stirring was initiated. After the addition of 4 days of diphenylethylene as an indicator the solution was titrated to an orange color with s-butyllithium. An additional 1.5 ml of s-butyllithium was added. After stirring for 5 minutes, 3.2 ml of isoprene were added and the solution was stirred for 15 minutes as the color turned a light orange. After addition of 1.0 ml of divinylbenzene the solution was stirred for 20 minutes as the color, initially blood red, turned somewhat lighter. While stirring continued, 13.0 ml of t-butyl methacrylate were added. The polymerization was terminated by the addition of methanol and allowed to stand overnight as the color changed from water white to light yellow. The solvent was removed by evaporation and the resulting product was coagulated in methanol and water.

ILLUSTRATIVE EMBODIMENT III

A glass polymerization bottle equipped with a stirrer was flushed with nitrogen and 200 ml of cyclohexane about 5.0 ml of diethyl ether were added. Stirring was initiated and after the addition of 4 drops of diphenylethylene as indicator the solution was titrated with s-butyllithium to an orange color. An additional 1.5 ml of s-butyllithium was added and the resulting solution was stirred for 15 minutes. As stirring continued, 3.2 ml of isoprene was added dropwise. One milliliter of divinylbenzene was then added as the color of the solution turned blood red. After stirring for 10 minutes as the color of the solution became lighter, 13.0 ml of t-butyl methacrylate were added as the solution turned light yellow in color. After 30 minutes the solution was almost water white. Polymerization was then terminated by addition of methanol and the polymeric product was coagulated in methanol and water.

What is claimed is:

1. A block polymer of the star type having a central core of crosslinked di(alkenyl) aromatic hydrocarbon and a plurality of functionalized branches wherein at least the terminal portion is polymerized alkyl methacrylate polymerized through the ethylenic unsaturation of the methacrylate moiety, the polymer having the formula $$(A)_r C \left[ (A)_r M \right]_s$$

wherein C is the core of crosslinked di(alkenyl) aromatic hydrocarbon, A independently is a block of polymerized anionically polymerizable monomer, M is a block of the polymeized alkyl methacrylate, r is 0 or 1, s is an average number from about 3 to about 50, and t is a number up to about 50 which is equal to or greater than s.

2. The polymer of claim 1 wherein the alkyl of the alkyl methacrylate moieties independently has up to 30 carbon atoms.

3. The polymer of claim 2 wherein the anionically polymerizable monomer is styrene or isoprene.

4. The polymer of claim 3 wherein C is no more than 10% of the molecular weight of the polymer.

5. The polymer of claim 4 wherein, in the branches $-(A)_r M$, the polymerized alkyl methacrylate is at least about 50% of the molecular weight of the branches.

6. The polymer of claim 5 wherein r is zero.

7. The polymer of claim 6 wherein the di(alkenyl) aromatic hydrocarbon is divinylbenzene.

8. The polymer of claim 7 wherein the alkyl methacrylate is branched-butyl methacrylate.

9. The polymer of claim 8 wherein the branched-butyl is t-butyl.

10. A process of producing a block polymer of the star type having functionalized branches which consists essentially of a) contacting an anionically polymerizable monomer with a metal hydrocarbon compound in liquid phase solution under polymerizable conditions to produce a polymeric anionically polymerizable monomer having an organometallic site as a polymerization initiator, b) contacting the initiator with a di(alkyl) aromatic hydrocarbon under polymerization conditions to produce a central core of crosslinked di(alkenyl) aromatic hydrocarbon having a plurality of organometallic sites as a first block polymer intermediate, c) optionally contacting the core of di(alkenyl) aromatic hydrocarbon with an anionically polymerizable monomer under polymerization conditions to produce a second block polymer intermediate of a core of crosslinked di(alkenyl) aromatic hydrocarbon and a plurality of branches of polymerized anionically polymerizable monomer having terminal organometallic sites, d) contacting the first or second block polymer intermediate with an alkyl methacrylate under polymerization conditions, and e) terminating the polymerization with an active hydrogen compound.

11. The process of claim 10 wherein the anionically polymerizable monomer is alkenyl aromatic compound or conjugated alkadiene.

12. The process of claim 11 wherein the di(alkenyl) aromatic hydrocarbon has up to 20 carbon atoms and up to 2 aromatic rings.

13. The process of claim 12 wherein the alkyl moiety of the alkyl methacrylate has up to 30 carbon atoms.

14. The process of claim 13 wherein the metal hydrocarbon compound is an alkali metal alkyl.

15. The process of claim 14 wherein the alkali metal alkyl is a lithium alkyl.

16. The process of claim 15 wherein the di(alkenyl) aromatic hydrocarbon compound is divinylbenzene.

17. The process of claim 16 wherein the anionically polymerizable monomer is styrene, isoprene, butadiene, or 4-vinylpyridine.

18. The process of claim 17 wherein the alkyl methacrylate is branched-butyl methacrylate.

19. The process of claim 18 wherein the anionically polymerizable monomer is isoprene.

20. The process of claim 19 wherien the branched-butyl methacrylate is t-butyl methacrylate.

* * * * *